United States Patent [19]

Hatfield

[11] Patent Number: 4,844,860

[45] Date of Patent: * Jul. 4, 1989

[54] SUPPORT GRID WITH INTEGRAL VANES

[75] Inventor: Stephen C. Hatfield, Granby, Conn.

[73] Assignee: Combustion Engineering, Inc., Windsor, Conn.

[ * ] Notice: The portion of the term of this patent subsequent to Mar. 1, 2005 has been disclaimed.

[21] Appl. No.: 48,336

[22] Filed: May 11, 1987

Related U.S. Application Data

[63] Continuation-in-part of Ser. No. 876,592, Jun. 20, 1986, Pat. No. 4,728,489.

[51] Int. Cl.$^4$ ............................................. G21C 3/34
[52] U.S. Cl. .................................................... 376/439
[58] Field of Search ............... 376/439, 441, 442, 443, 376/462, 438

[56] References Cited

U.S. PATENT DOCUMENTS

| | | | |
|---|---|---|---|
| 3,809,609 | 5/1974 | Krawiec et al. | 376/439 |
| 3,847,736 | 11/1974 | Bevilacqua | 376/439 |
| 3,933,584 | 1/1976 | Litt | 376/439 |
| 4,039,379 | 8/1977 | Patterson et al. | 376/439 |
| 4,089,741 | 5/1978 | Patterson et al. | 376/439 |
| 4,295,935 | 10/1981 | Anthony | 376/442 |
| 4,576,786 | 3/1986 | DeMario | 376/439 |
| 4,692,302 | 9/1987 | DeMario et al. | 376/439 |
| 4,698,204 | 10/1987 | Taleyarkhan | 376/439 |
| 4,728,489 | 3/1988 | Hatfield | 376/439 |

*Primary Examiner*—Charles T. Jordan
*Assistant Examiner*—Daniel Wasil
*Attorney, Agent, or Firm*—John H. Mulholland

[57] ABSTRACT

A fuel element support grid for supporting a plurality of nuclear fuel elements intermediate their ends has at least some of the pairs of intersecting and slottedly interlocked strips including pairs of intersecting integral fluid flow directing vanes along at least one adjacent edge of each of the strips of the pair. Welds attach the pair of vanes to each other thereby providing welded attachment of the strips. The welds may be at the intersection of the vanes remote from their areas of integral attachment to their respective strips or they may be adjacent to their areas of integral attachment to their respective strips. The strips may be bent to provide the strip function and the arch function within the same stream engaging profile as the strip alone presents.

10 Claims, 6 Drawing Sheets

SUPPORT GRID WITH INTEGRAL VANES

This application is a continuation-in-part of U.S. Ser. No. 876,592, filed June 20, 1986, now U.S. Pat. No. 4,728,489.

FIELD OF THE INVENTION

The present invention relates to nuclear reactors and more particularly to supporting spaced fuel elements in bundles or assemblies in the reactor by means of a welded fuel element support grid with integral flow directing vanes which direct fluid flow for increased heat transfer.

BACKGROUND OF THE INVENTION

Fuel assemblies for nuclear reactors are generally provided in the form of fuel element or rod arrays maintained by a structure which includes a plurality of welded spacer grids, a lower end fitting and an upper end fitting. Guide thimbles provide the structural integrity between the lower end fitting, the upper end fitting and the spacer grids intermediate the ends of the fuel assembly. The spacer grids define an array of fuel rods which, typically, may be rows and columns of up to 20 rods each. One such spacer and support grid is disclosed in U.S. Pat. No. 3,481,832.

The typical fuel element support grid for supporting a spaced array of nuclear fuel elements or rods intermediate their ends includes a generally quadrangular or other polygonal perimeter. A plurality of fuel element compartments or cells within the perimeter are defined by first and second grid-forming members or strips welded to the perimeter and joined to each other at their lines of intersection. The grid-forming members of the fuel element support grid are slotted for part of their width along lines of intersection with the other grid-forming members of the array such that they may be assembled and interlocked at their lines of intersection in what is termed "egg-crate" fashion. The grid-forming members of one embodiment of the present invention are also bent at points corresponding to intermediate points of the compartments for reasons discussed in U.S. Pat. No. 3,423,287. The wavy-strip structure of this embodiment has been utilized because it provides a good strength-to-weight ratio without severely affecting the flow of cooling or moderating fluid through the grid of the nuclear reactor. The grid strip bends typically act as internal arches and act with integral projecting springs for engaging and supporting the fuel elements within the compartments. Thus, at each fuel rod grid position in the fuel assembly, axial, lateral and rotational restraint is provided against fuel rod motion due to coolant flow, seismic disturbance or external impact. The spacer grids also act as lateral guides during insertion and withdrawal of the fuel assembly from the reactor. All of the elements of the fuel lattice, including the springs and the arch forming bends within the compartments, are arranged with respect to the fuel coolant flow in order to minimize pressure drop across the grid. Since separate arches out of the plane of the grid-forming members are not necessary, a minimum pressure drop is accomplished.

In U.S. Pat. No. 3,764,470, a flow twister, mixing vane, or fluid flow directing vane was disclosed for redirecting the cooling fluid in the channels between the spaced parallel nuclear fuel elements. Those twisters where U-shaped metal sheets which straddled one grid member at an intersection with the free ends of the "U" folded on themselves to form two pairs of oppositely directed spirals and a pair of slots receiving the other grid member. The purpose of the twisters was to direct cooling fluid inwardly toward and spirally around the adjacent fuel rods. The desirability and theory of their use is described in the "Background of the Invention" of U.S. Pat. No. 3,764,470. The same background is applicable to the invention described herein. This patent also shows bent or "wavy" grid-forming members which define integral arches.

SUMMARY OF THE INVENTION

Fluid flow directing vanes or "mixing vanes" provided according to the principals of the invention are integral to the strips and provide improved strength for the grid and improved hydraulic performance of the type previously provided by the separate "twisters" of U.S. Pat. No. 3,764,470. A major advantage of the fluid flow directing vanes being integral is that there is little chance of them becoming loose parts or debris within the flow stream circulating in the reactor in a manner which would damage the internals of the reactor. Moreover, the particular design of the integral fluid flow directing vanes of the instant invention where present provide the grid with increased strength over conventional grids with or without integral fluid flow directing vanes because the vanes themselves are "contained" and provide a strong means of attaching the strips of an intersecting pair to each other.

The advantages provided by the invention are accomplished in a spacer grid assembly of typical egg-crate assembly but with strips intersecting at additional points for some or all intersections formed by two strips. Individual strips of only four different types are required to produce the interior area of the grid using wavy strips but additional types to produce special fuel rod support features or special cells to accommodate guide thimbles or guide tubes can be made compatible with the four basic strips. The attachment welds at any such reinforced pair of intersecting strips in the region of the flow directing vanes can be, optionally, made at either one, two, or three locations in a manner that will be described hereinafter.

A grid constructed according to the principles of the invention, with its novel integral flow directing vanes and bends provides superior performance over other designs of grids during seismic events and other off-normal conditions and during normal reactor operation.

During fabrication, the strip shape is stamped and bent into wavy shape. No manual or other post assembly bending requirements to form and position the vanes is required. Because of the particular shape of the integral flow directing vanes, they pass the fuel rod support springs and arches or bends more readily during assembly than do bent mixing vanes of a conventional design as for example seen in U.S. Pat. No. 4,576,786. Moreover, because of the particular design of the grid and "contained" integral fluid flow directing vanes, there is easier access to the welds and less criticality in the least accessible or intermediate weld, if it is chosen to use one, in the area adjacent the integral attachment of the vanes to the strips. Since the vanes are integral and "contained" within the normal width of the strips without projecting beyond the strip edges, the flow directing vanes are less likely to be damaged during use and during fuel assembly fabrication than are the projecting types of integral vanes previously utilized.

If desired, fluid flow directing vanes according to the invention can be provided on both the upstream and downstream side of the grid structure.

The novel flow directing vanes' performance during seismic events or other off normal conditions provides resistance to lateral loading because they are "contained" and not projecting. The grid reinforcement is in part due to the fact that span lengths of the thin cross-sections are reduced at some corners by means of the shape of the fluid flow directing vanes.

Accordingly, a reduced strip cross-section will provide a resistance to lateral loading that is equivalent to that achieved with a conventional design. The benefits of the reduced cross-section can be utilized elsewhere. For example, the thinner cross-section will effect a lower pressure drop for a given strength or given resistance to damage from seismic events or it will permit the use of larger diameter fuel elements with no net effect on pressure drop.

Alternately, a change could be made from a conventional grid design of a given material to the current invention with an inherently weaker, but more economical material, while maintaining the cross-section of the strips. The structural improvement afforded by the design would offset the inferior material properties.

During normal operation, the fluid flow directing vanes provide a good mix from the open or corner areas of the fuel element cells to the tight areas. This mix affords better heat transfer and a better "thermal margin" for reasons discussed in U.S. Pat. No. 3,764,470. This is accomplished with an acceptable pressure drop because of the reduced cross-section of the strips for a given required grid strength. The "contained" integral flow directing vanes also reduce pressure drop from conventional grids by permitting smaller than conventional weld nugget sizes. Moreover, the weld geometry at the intersection of two strips in a conventional grid structure provides greater flow restriction and undesirable turbulence than welds required at the vane's intersections of the present invention. This is true whether the strips are straight or bent. Also, without the abrupt flow control surface bends which integral flow control vanes have exhibited in the past, a lower pressure drop across the grid than would otherwise be the case is produced by the "contained" vanes of the invention.

During fuel assembly reconstitution, individual fuel elements may be removed from and reinserted into the assembly. Individual mixing vanes which project beyond the strip edges, as in a conventional design, can become bent during the reinsertion process as the tip of the fuel element first approaches the grid. This bending can lead to blockage of further insertion, or to contact with the reinserted element or adjacent elements during subsequent operation. Such contact can initiate local wear and possibly breaching of the fuel element cladding tube. Also, if the bending of a conventional vane is severe enough, the vane could fracture and become debris within the circulating fluid of the nuclear reactor. Such debris is a common source of fuel element breaching in operating reactors. The "contained" vanes of the instant invention provide a geometry which is impervious to damage by fuel elements during reconstitution, thereby eliminating concerns of contact or debris during subsequent operation.

The spacer grid embodiment utilizing wavy strips represents an advantage over designs which use straight strips. The hydraulic performance of the wavy grid is such that a grid with straight strips which has both a compatible pressure drop and an equivalent strength has not been found. The embodiment of wavy strips described in this continuation-in-part application provides a potential means to further improve this hydraulic advantage, and at the same time to improve the corrosion behavior and DNB performance of the fuel.

BRIEF DESCRIPTION OF THE DRAWINGS

In FIGS. 1-8, the fuel rod support features, including springs and arches, are omitted for purposes of clarity.

DESCRIPTION OF THE PREFERRED EMBODIMENTS

Figure 1:
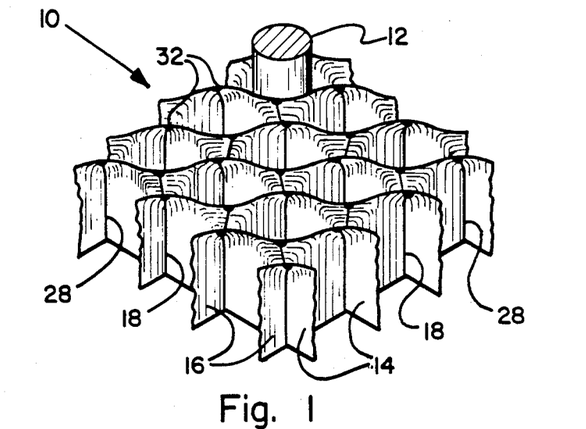
FIG. 1 is an isometric view of a portion of a fuel assembly with a fuel element support grid with straight strips having integral fluid flow directing vanes in accordance with the principles of the invention.

The fuel element support grid of the invention, which includes intersecting integral fluid flow directing vanes "contained" within the strip width, is generally designated by the numeral 10. In FIG. 1, a fuel element or rod 12 is shown in position within one of the fuel cells for illustrative purposes. The support grid itself is made up of Type 1 strips 14 which show in FIG. 2 as being horizontal and parallel and Type 2 strips 16 which show in FIG. 2 as vertical and parallel.

The strips 14 and 16 are stamped strips and are preferably of zircaloy, a common name for an alloy of zirconium with low percentages of tin, iron, chrome and nickel. Other well known grid materials ar Inconel and AM-350.

Figure 3:
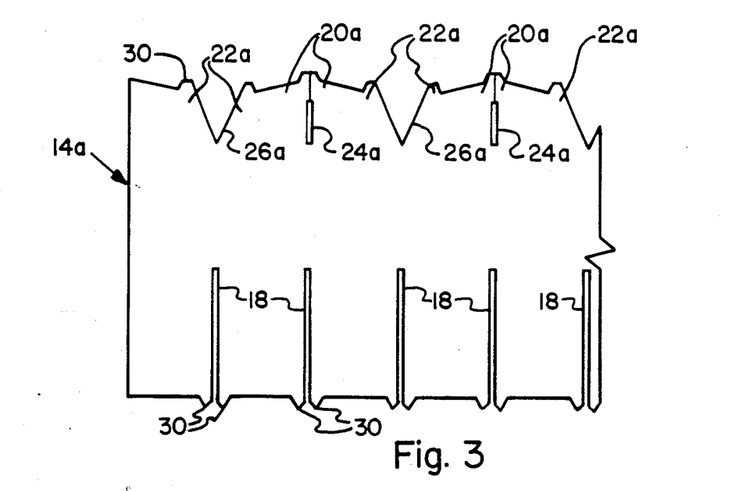
FIG. 3 is an elevational view of a blank for a first or "Type 1" strip of the fuel element support grid of FIGS. 1 and 2, prior to stamping.
Figure 4:
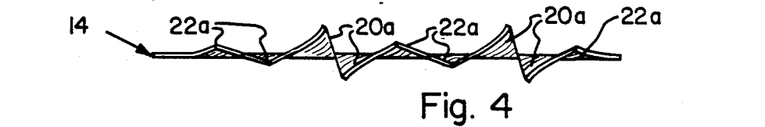
FIG. 4 is a plan view of the strip of FIG. 3 subsequent to stamping.
Figure 5:
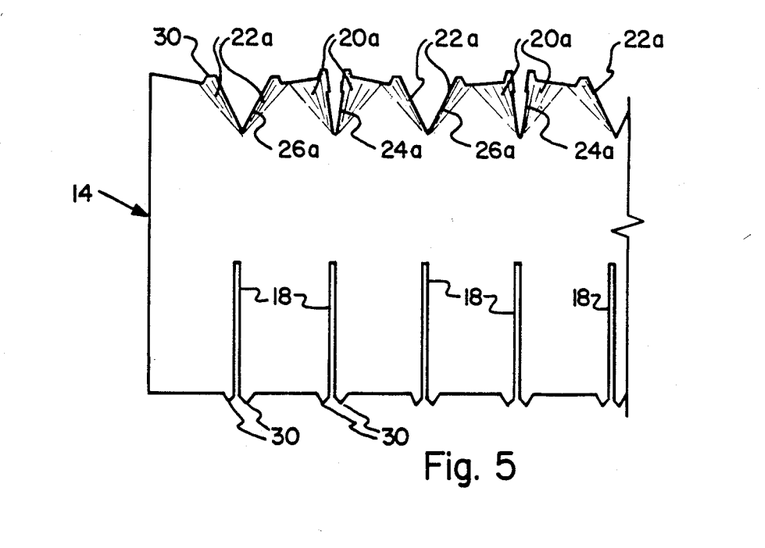
FIG. 5 is an elevational view of the strip of FIG. 4.

Type 1 strip 14 is illustrated in FIGS. 4 and 5. The strip blank 14a, prior to stamping is seen in elevation in FIG. 3. Blank 14a includes slots 18 along its upstream marginal edge regularly spaced for receipt of Type 2 strips which will intersect with it in an "egg-crate" relationship. On the opposite edge of strip blank 14a are areas which will become major flow directing vanes 20a and minor flow directing vanes 22a. Separating each two major flow directing vanes 20a is a slot 24a each in alignment with a slot 18, and separating each two minor flow directing vanes 22a are V-cuts 26a, each in alignment with a slot 18.

When the zircaloy strip blank 14a is stamped to create the Type 1 strips as seen in FIGS. 3 and 4, its portions 20a and 22a become the finally shaped major integral flow directing vane portions 20a and 22a, respectively, separated by slots and cuts 24a and 26a, as shown in FIGS. 4 and 5.

Figure 6:
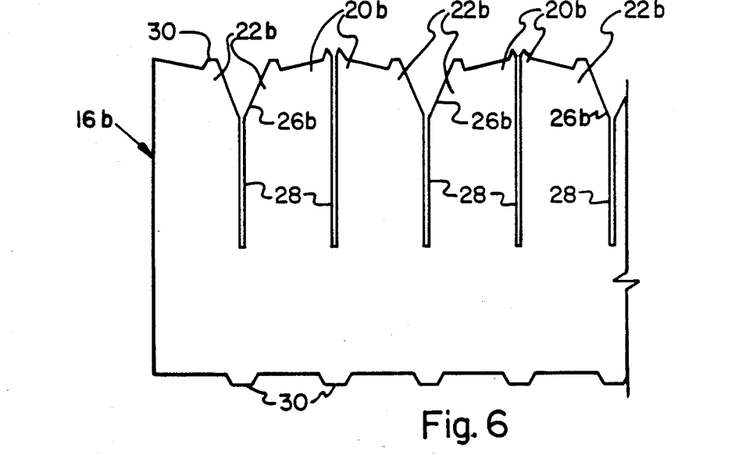
FIG. 6 is a view similar to FIG. 3 of a blank for a second or "Type 2" strip.
Figure 7:
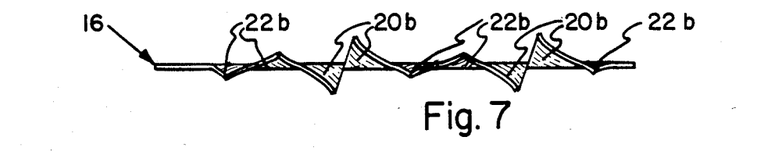
FIG. 7 is a view similar to FIG. 4 of the "Type 2" strip.
Figure 8:
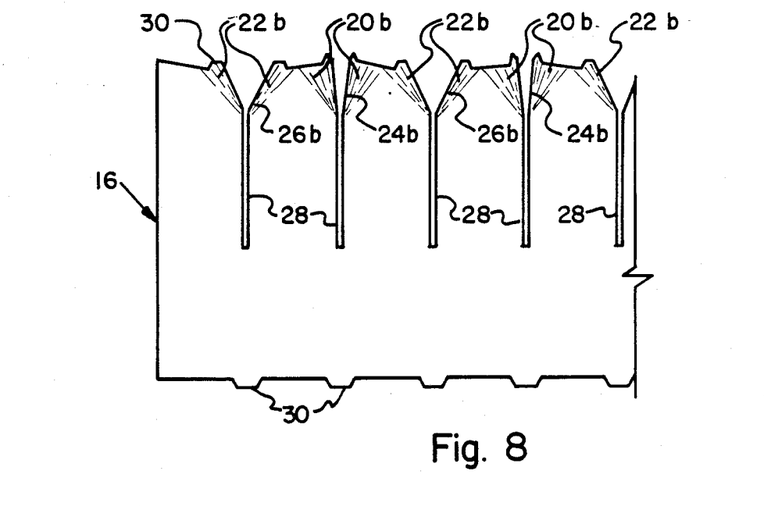
FIG. 8 is a view similar to FIG. 5 of the "Type 2" strip.

FIGS. 6-8 correspond to FIGS. 3-5, except that FIG. 6 illustrates the Type 2 strip blank 16b and the integral fluid flow directing vane portions 20b and 22b are defined by V-cuts 26b and slots 28 along the downstream edge. The strips 16 cooperate with the strips 14 to provide the pairs of first and second intersecting and slottedly interlocking grid-forming strips. Each of the integral fluid flow directing vane portions 21a, 20b, 22a, and 22b have a weld material providing tab 30 thereon. Weld material providing tabs 30 also are located on either side of slots 18 and at the bottom edge of strip 16 opposite slots 28, on the lines of strip intersection.

Turning again to FIG. 2, it will be seen that the fuel element support grid of the invention has geometry unlike the geometry of previous spacer grip designs because the strips on one side of the grid intersect at three points for each of the intersections formed by two strips 14 and 16. During operation, the spacer grid illustrated is oriented normally such that the grid side with the integral fluid flow directing vanes is downstream. If required for adequate circulation or further improvement to loading resistance, however, the geometry of the strips 14 and 16 could be such that they may be formed and assembled with integral fluid flow directing vane portions 20 and 22 at both the upstream and downstream extremities of the grid cells.

The three point intersection of the flow directing vanes is accomplished by the illustrated shapes of the individual strips 14 and 16. Obviously, additional types of strips may be used, such as those shown in FIG. 9-19 as strips 14' and 16', described hereinafter, to produce a grid design with special fuel rod support features or with special cells to accommodate structural components of the fuel assembly. The strips 14 and 16 engage and are welded to a perimeter strip 40 which has no outward projections. It will be seen that certain portions of the flow directing vane portions 20 and 22 may be cropped to maintain the rectangular configuration within the perimeter.

Figure 2:
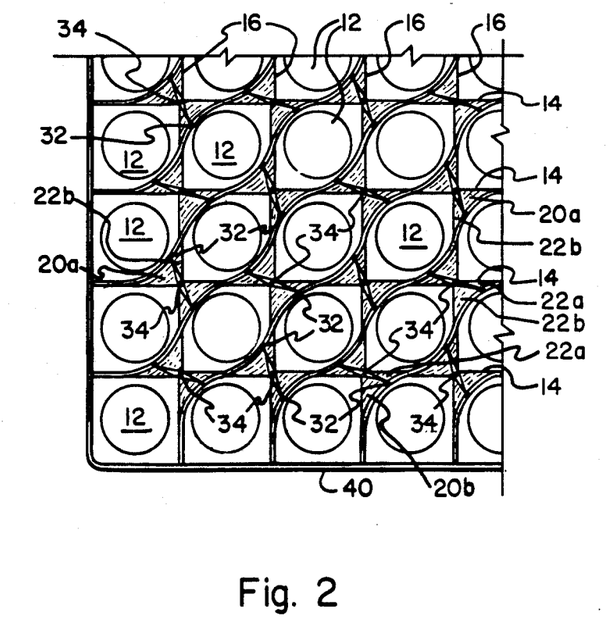
FIG. 2 is a somewhat schematic plan view of the fuel element support grid of FIG. 1.

It is contemplated that only two of the three contact points could be welded at each intersection, as shown at points 32 in FIG. 2. Alternately, a third weld 34 can be provided for added strength. A third alternative exists for only using weld 34 to form the completed structure. In other words, the welds 32 of the illustrated embodiments would be located at the perimeter edge to perimeter edge mating intersections of the edges of the plurality of pairs of the integral fluid flow directing vane portions 20a, 20b, 22a and 22b remote from the areas of integral attachment of the vane portions 20a, 20b, 22a and 22b to their respective strips 14 and 16. The areas of integral attachment referred to for the weld 34 locations are at the base of cuts and slots 24a, 26a, 24b and 26b when the strips 14 and 16 are assembled. The welds 32 typically are formed from the material 30 by a tungsten inert gas welding operation and the welds 34 typically by electron beam or laser welding but other techniques may be used. It will be seen that in assembling the Type 1 and Type 2 strips into an intersecting relationship, alternate Type 1 strips are rotated 180° and alternate Type 2 strips are rotated 180°. This creates a pattern of generally sinusoidal diagonal curves on the downstream side of the grid in the straight strip embodiment.

In strength tests of models of selected internal grid portions designed to simulate both a conventional fuel element support grid and a fuel element support grid of the invention with its "contained" integral fluid flow directing vanes, a strength improvement of at least 63% was found in the new structure over the conventional grid structure of the same strip height and the same strip thickness. This 63% strength improvement figure was obtained for samples with the mixing vanes on one side of the grid only, and for two of the three alternative weld configurations. Fuel element support springs and arches were not included in any of the samples. The testing of the simulated grids suggested that the presence of springs and arches on the grid structure would be no more deleterious than in a standard grid structure. Moreover, as seen in FIGS. 9-19, advanced design wavy grids with bent strips performing the arch function are compatible with the new vane structure.

The strength improvement was found in tests involving ten samples of grids similar to that depicted in FIG. 1. All samples had weld nuggets at the strip intersections on the upstream side or the side of the grid remote from the integral fluid flow directing vanes. The welds were tungsten inert gas welds. Samples A and B had welds as seen in FIG. 2 at locations 32 provided to attach the vanes to each other, thereby attaching the first and second intersecting and slottedly interlocking strips of each pair of Type 1 and Type 2 strips together. Samples A and B were loaded in a direction parallel to the Type 2 strips. Samples C and D were the same as Samples A and B but the load direction was applied at right angles. Sample E was like Samples A and B but included two cells spaced from each other containing thimbles. Sample F was the same as Sample E with the load applied at right angles. Samples E and F had no vane welds in the grid cells containing the thimbles (location 32 in FIG. 1). Samples G and H had electron beam welds at the point of intersection of the integral fluid flow directing vanes adjacent their areas of integral connection with the strips (location 34 in FIG. 1) but were otherwise the same as Samples A and B. Samples I and J were the same as Samples G and H with the load applied at right angles. In the case of Sample J, one electron beam weld on the downstream side was missing. All grids were the same size, to the extent possible.

TABLE I

| Samples | Load Capability (lb.) |
|---|---|
| A | 1120 |
| B | 1300 |
| C | 1270 |
| D | 1230 |
| E | 1200 |
| F | 1100 |
| G | 1210 |

TABLE I-continued

| Samples | Load Capability (lb.) |
| --- | --- |
| H | 1337 |
| I | 1490 |
| J | 1337 |
| (Conventional Grids) | (654,697,642,689,680) |

An obvious strength improvement over conventional grids was obtained with the grid of the present invention and its integral fluid flow directing vanes. While the third possible weld configuration was not tested (welds only at locations 34 in FIG. 1), a strength improvement would also be expected with this type grid.

In the embodiment illustrated in FIGS. 9-19, the grid members include bends 42 at intermediate points along sides of the compartments formed by the strips. The bends 42 provide integral arch-acting strip portions for fuel rod support, thus eliminating the need for prior art flow-blocking fuel support arches projecting out of the strip plane or profile. Such a structure obviously minimizes the support structure interference with flow since the strip cross-section provides the strip support function and the arch stiff contact function within the same stream engaging profile as the strip alone presents. Thus there is no necessity for discrete arches projecting from the body of the strip. This advantage is present and still permits use of the cantilever shape of springs 52 which blocks less flow area than axially-oriented spring types used by others.

Competing grids with a pressure drop effect as low as permitted by this wavy strip design which include, for example, separate arches, will not have a sufficient mechanical strength to accommodate the design loads associated with seismic or lossof-coolant accidents. In those design cases, the strip thickness must be increased and either the fuel support pressure drop will increase or other fuel components besides grids must be modified (and weakened) in order to maintain a pressure drop as low as permitted by this new wavy strip design. Moreover, if thinner strip material is used in an attempt to match the low pressure drop permitted by this wavy or bent strip embodiment, the effect of normal hydrogen embrittlement and surface oxidation will be greater because of the thinner material. This can represent a limit on the residence time permitted for the fuel.

Figure 9:
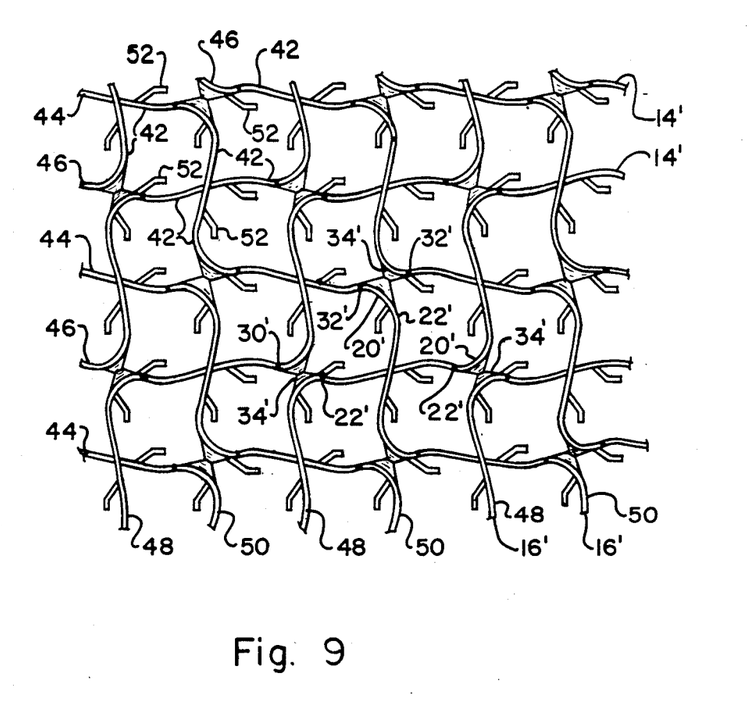
FIG. 9 is a plan view of a spacer grid design embodiment which includes bends at intermediate points along compartment sides to provide integral arch-acting strip portions for fuel rod support; thus eliminating the need for flow-blocking arches projecting out of the strips' profile or plane.

Comparing the embodiment illustrated in FIG. 9 to that of FIGS. 1-8, it can be seen that every second intersection of wavy strips 14' and 16' has been modified to utilize the geometry of the FIGS. 1-8 intersecting vane portions as shown at major vane portions 20' and minor vane portions 22'. Welds 32' and 34 along the perimeter edge to perimeter edge mating intersections of the FIG. 9 embodiment correspond to the welds 32 and 34. The geometry of strips contacting along contoured surfaces as taught in the FIG. 1-8 embodiment is preserved and still permits the wavy or bent strip advantages.

Individual strip geometries which comprise the grid shown in FIG. 9 are illustrated in FIGS. 10-17.

Figure 10:
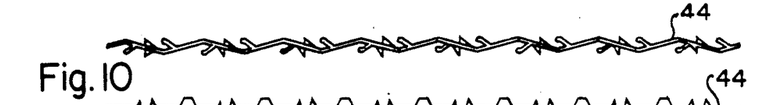
FIG. 10 is a plan view of a first type of bent strip for use in the FIG. 9 embodiment.
Figure 11:
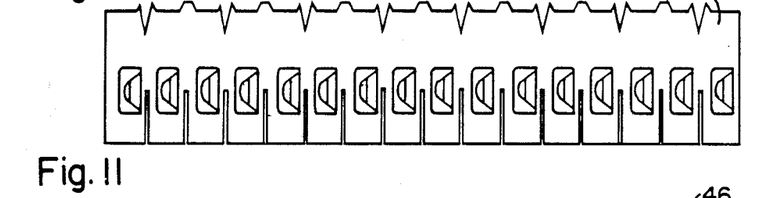
FIG. 11 is an elevational view of the strip of FIG. 10.

The strip type illustrated in FIGS. 10 and 11 is designated 44 in FIG. 9.

Figure 12:
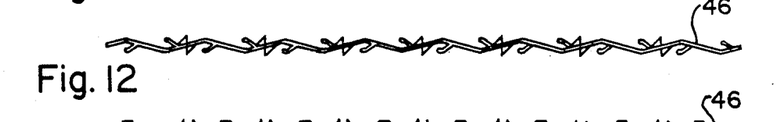
FIG. 12 is a plan view of a second type of bent strip for use in the FIG. 9 embodiment.
Figure 13:
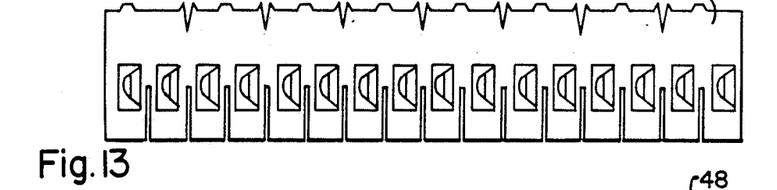
FIG. 13 is an elevational view of the strip of FIG. 12.

The strip type illustrated in FIGS. 12 and 13 is designated 46 in FIG. 9.

Figures 14, 15, 16:
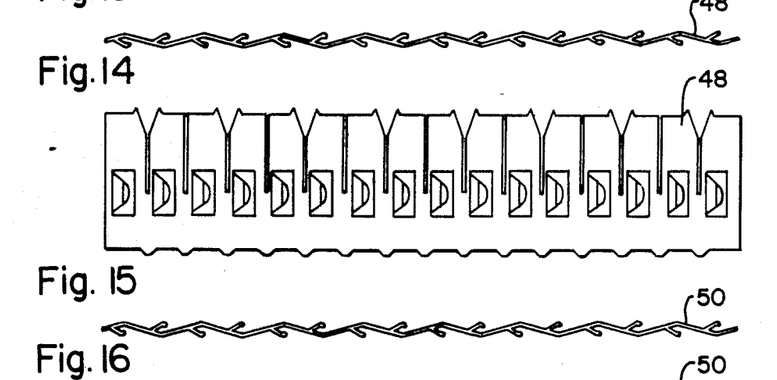
FIG. 14 is a plan view of a third type of bent strip for use in the FIG. 9 embodiment.
FIG. 15 is an elevational view of the strip of FIG. 14.
FIG. 16 is a plan view of a fourth type of bent strip for use in the FIG. 9 embodiment.

The strip type illustrated in FIGS. 14 and 15 is designated 48 in FIG. 9.

Figure 17:
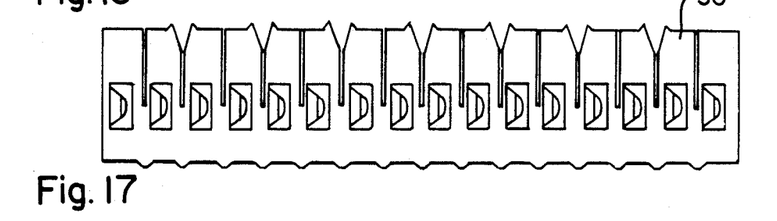
FIG. 17 is an elevational view of the strip of FIG. 16.

The strip type illustrated in FIGS. 16 and 17 is designated 50 in FIG. 9.

Because the grid utilizing wavy strips has different performance characteristics under loading, it is contemplated that despite the reduced number of reinforced intersections in the embodiment of FIGS. 9-19, the strength improvement to be gained by the new geometry may be even more significant than that in the straight strip embodiment of FIGS. 1-8.

Hydraulically, the increased blockage area and taller strip height associated with the new design represent penalties in pressure drop. On the other hand, it is believed that the reinforcement provided by the new design will enable a reduction in strip thickness or weld nugget size that will more than compensate for these penalties. Therefore, the overall grid pressure drop with the new design would be lower than for an equivalent strength grid.

Figure 18:
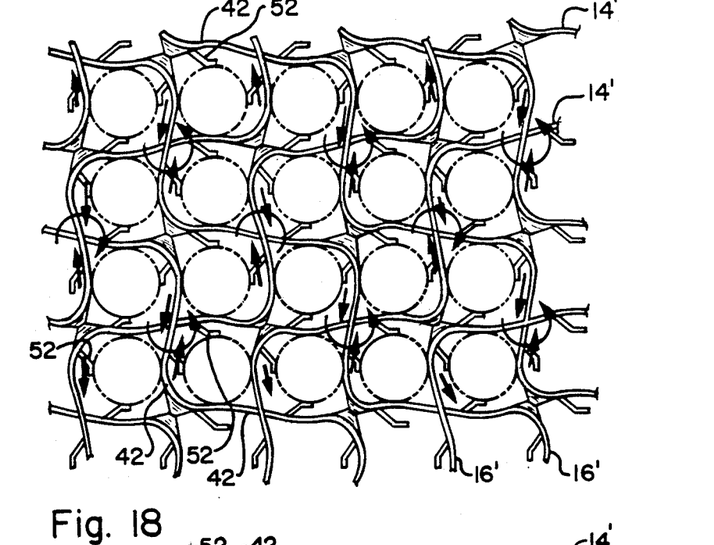
FIG. 18 is a view similar to FIG. 9 showing the effect of the underside of the strip intersections on flow patterns.
Figure 19:
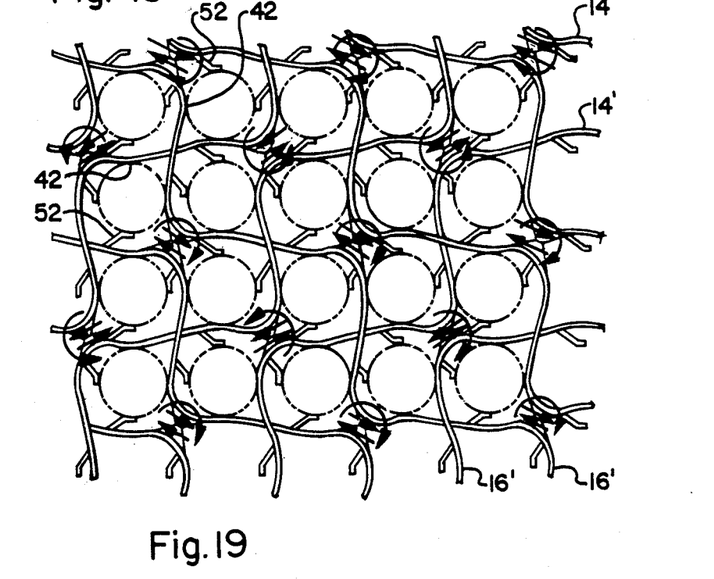
FIG. 19 is a view similar to FIG. 9 showing the effect of the top side of the strip intersections on flow patterns.

In the case of the wavy strip design of FIG. 9-19, features of the grid strips that existed in the design of FIGS. 1-8 are utilized to improve the downstream DNB benefit. As shown in FIGS. 18 and 19, every subchannel in the fuel rod array has both redirected flow and swirl established by the new feature. This should improve not only the DNB performance, but also corrosion behavior since there will be a more uniform temperature distribution within the rod array.

The wavy strip grid design of FIGS. 9-19 should produce reduced pressure drop, equivalent strength, and improved thermal performance and corrosion behavior.

What is claimed is:

1. In a fuel element support grid for supporting a plurality of nuclear fuel elements intermediate their ends in spaced relation for fluid flow therebetween, said grid including a polygonal perimeter and a plurality of fuel element compartments defined by pairs of first and second intersecting and slottedly interlocked wavy grid-forming strips attached to said perimeter and to each other, the improvement comprising:

at least some of said compartments defined by pairs of first and second intersecting and slottedly interlocked strips, and some of said pairs of first and second strips including a pair of perimeter edge to perimeter edge matingly intersecting smoothly contoured integral fluid flow directing vane portions curving from the planes of their respective strip portions along at least one adjacent edge of each of the strips of the pair and said strips having bends at at least some intermediate points between strip intersections.

2. The fuel element support grid of claim 1 which includes means for attaching said pair of vane portions to each other, thereby attaching said first and second intersecting and slottedly interlocked strips of said pair of strips together.

3. The fuel element support grid of claim 1 in which the means for attaching said pair of vane portions to each other is a fusion bond.

4. The fuel element support grid of claim 3 in which the fusion bond is a weld.

5. The fuel element support grid of claim 1 in which all of the integral fluid flow directing vanes are on the downstream edges of the strips relative to the direction of fluid flow between the fuel elements.

6. The fuel element support grid of claim 2 in which the means for attaching said pair of vane portions to each other includes welds at the intersections of the edges of a plurality of pairs of the integral fluid flow directing vane portions remote from the areas of integral attachment of the vane portions to their respective strips.

7. The fuel element support grid of claim 2 in which the means for attaching said pair of vane portions to each other includes welds at the intersections of the edges of a plurality of pairs of the integral fluid flow directing vane portions adjacent to the areas of integral attachment of the vanes to their respective strips.

8. The fuel element support grid of claim 2 in which the means for attaching said pair of vane portions to each other includes welds at the intersections of the edges of a plurality of pairs of the integral fluid flow directing vane portions both remote from and adjacent to the areas of integral attachment of the vane portions to their respective strips.

9. The fuel element support grid of claim 2 in which the bends act as integral fuel arches within the profile of the wavy strip.

10. The fuel element support grid of claim 1 in which said bends include means for contacting a fuel element, said means lying within the profile of the strip presented to the flow of fluid through the grid.

* * * * *